United States Patent
Nikiforov

(10) Patent No.: US 9,167,524 B2
(45) Date of Patent: Oct. 20, 2015

(54) ASSISTANT METHOD AND SYSTEM FOR RETRIEVING WIRELESS SIGNALS FOR MOBILE DEVICES

(71) Applicant: Samsung Electronics Co., Ltd., Gyeonggi-do (KR)

(72) Inventor: Alexander Alexandrovich Nikiforov, Moscow (RU)

(73) Assignee: Samsung Electronics Co., Ltd (KR)

( * ) Notice: Subject to any disclaimer, the term of this patent is extended or adjusted under 35 U.S.C. 154(b) by 105 days.

(21) Appl. No.: 14/075,554

(22) Filed: Nov. 8, 2013

(65) Prior Publication Data

US 2014/0128122 A1 May 8, 2014

(30) Foreign Application Priority Data

Nov. 8, 2012 (RU) ................................ 2012147530

(51) Int. Cl.
| | | |
|---|---|---|
| *H04B 7/00* | (2006.01) | |
| *H04W 52/02* | (2009.01) | |
| *H04W 4/00* | (2009.01) | |

(52) U.S. Cl.
CPC .......... *H04W 52/0229* (2013.01); *H04W 4/008* (2013.01); *Y02B 60/50* (2013.01)

(58) Field of Classification Search
CPC ....... H04W 8/005; H04W 48/16; H04W 4/06; H04W 84/18; H04W 88/06; H04W 48/14; H04W 36/0077
USPC ...................................... 455/41.2, 7, 11.1, 13
See application file for complete search history.

(56) References Cited

U.S. PATENT DOCUMENTS

2004/0109439 A1 6/2004 Kiss et al.
2007/0183374 A1 8/2007 Classon et al.
(Continued)

FOREIGN PATENT DOCUMENTS

EA 010985 12/2008
KR 20100028189 3/2010
(Continued)

OTHER PUBLICATIONS

Russian Office Action dated Mar. 25, 2014 issued in counterpart application No. 2012147530.
(Continued)

*Primary Examiner* — Tu X Nguyen
(74) *Attorney, Agent, or Firm* — The Farrell Law Firm, P.C.

(57) ABSTRACT

A method, system, and device are provided for obtaining auxiliary information about various wireless signal sources and for the subsequent sharing the received information with other UE devices located nearby. The method includes broadcasting, by a UE Assistance Module, a request for obtaining auxiliary information from a public LPWN and receiving broadcast messages containing auxiliary information from the LPWN; checking the received broadcast messages for presence of auxiliary information regarding desired sources of wireless communication; refining, on the basis of the received auxiliary information, the indeterminacy range of the wireless signal parameters by means of the UE Assistance Module and by switching the UE transceiver on and off; storing the auxiliary information in a UE local cache and keeping the auxiliary information updated; and adding the auxiliary information from the UE local cache to a broadcast message via the LPWN.

8 Claims, 8 Drawing Sheets

(56) References Cited

U.S. PATENT DOCUMENTS

| | | |
|---|---|---|
| 2008/0318547 A1 | 12/2008 | Ballou, Jr. et al. |
| 2009/0079622 A1 | 3/2009 | Seshadri et al. |
| 2009/0081952 A1* | 3/2009 | Lee et al. ............... 455/41.2 |
| 2010/0134353 A1 | 6/2010 | van Diggelen |
| 2011/0153773 A1* | 6/2011 | Vandwalle et al. ........ 709/217 |
| 2012/0214526 A1 | 8/2012 | Selen et al. |

FOREIGN PATENT DOCUMENTS

| | | |
|---|---|---|
| RU | 2 315 436 | 1/2008 |
| WO | WO2011056102 | 5/2011 |

OTHER PUBLICATIONS

Decision on Grant dated May 14, 2014 issued in counterpart application No. 2012147530/08.

* cited by examiner

ASSISTANT METHOD AND SYSTEM FOR RETRIEVING WIRELESS SIGNALS FOR MOBILE DEVICES

PRIORITY

This application claims priority under 35 U.S.C. §119(a) to a Russian Patent Application Serial No. 2012147530, which was filed in the Russian Intellectual Property Office on Nov. 8, 2012, the entire disclosure of which is incorporated herein by reference.

BACKGROUND

1. Field of the Invention

The present invention generally relates to communication technologies, and more particularly, to increasing performance of mobile devices.

2. Description of the Related Art

When a wireless transceiver in a mobile device or in any other user equipment (UE) is switched on, the UE starts searching for wireless signals from a source of wireless communication signals (for example GNSS signal, Wi-Fi signal, etc). The UE tries to detect a signal again and again until the connection is established. This procedure requires significant resources and results in the premature discharge of the UE power supply. In a city, it may be very computationally expensive. Since at any moment a great number of UEs co-exist in public places, the chance that some of them are currently in contact with a source of wireless communication signals is rather high.

A UE can obtain information regarding available signal sources via a low power wireless network (LPWN) from other UEs, thereby reducing power consumption due to this auxiliary information. Such a goal can be achieved on the basis of a-priori knowledge about presence or absence of the desired sources.

Where a UE obtains information about the absence of the desired signal, one of the UE modules can switch off its transceiver until the moment when the UE receives information about the presence of this signal.

GPS technology includes Auxiliary GPS mode (AGPS) which enables connection with satellites by obtaining supplementary information from an assistance device. The assistance device transmits information regarding the available satellites, and the mobile device can try to acquire signal from those particular satellites without trying to acquire a signal from satellites which are not indicated by the assistance device. In this case, the UE is seeking for an assistance device and, if the search result is positive, the UE establishes the GPS connection with the help of the AGPS mode. Such an approach enables accelerating the search of a GPS signal and significantly decreases the power consumption in the UE.

The above mentioned technology is described in US Patent Application 2010/0134353. However, it works for GPS signals only. At present, no method is known for obtaining auxiliary information for arbitrary signals generated by any wireless sources.

WO 2011/056102 discloses a technical solution which describes two types of UEs connected by a secure communication channel: the first UE is always in an ON mode and the second UE, e.g. a mobile phone, is switched on occasionally. The first UE performs permanent spatial scanning for detecting active nodes of wireless communication. The other UE, upon entering a net, contacts the first UE to obtain a message with information regarding available active nodes, thus saving its own scanning resources. Such a message constitutes auxiliary information which substantially increases the mobile phone performance. The main drawback of this system consists in the necessity of paired UEs connected via a secure communication channel, thus seriously limiting the sphere of use.

SUMMARY

Aspects of the present invention consist of developing a method for increasing mobile device performance with the help of obtaining auxiliary information from any UE, and also a system for implementing the method.

According to an aspect of the present invention, use of an improved method for obtaining auxiliary information is disclosed. A method for obtaining auxiliary information regarding various sources of a wireless signal by a UE and for subsequent mutual exchange of the retrieved information between UEs located nearby is provided, the method including broadcasting, by means of a UE Assistance Module, a request for obtaining auxiliary information from a public low power wireless network (LPWN) and receiving broadcasted messages containing auxiliary information from the LPWN; checking the received broadcasted messages for presence of auxiliary information regarding desired sources of wireless communication; refining, on the basis of the received auxiliary information, a region of wireless signal parameters by means of the UE Assistance Module and by switching a UE transceiver on and off; storing the auxiliary information in a UE local cache and updating the auxiliary information; and adding the auxiliary information from the UE local cache to a broadcasted message via the LPWN.

In accordance with another aspect of the present invention, a UE in an LPWN is provided, which includes a system core containing, at least, a CPU and a Memory; an application core operating with OS configurations and with applications; a communication core containing wireless transceivers and being managed by an Assistance Module which broadcasts a request and receives messages for obtaining auxiliary information from an LPWN; and switches on or switches off wireless transceivers according to a configuration of the UE and received auxiliary information.

BRIEF DESCRIPTION OF THE DRAWINGS

The above and other aspects, features, and advantages of the present invention will be more apparent form the following detailed description when taken in conjunction with the accompanying drawings, in which.

DETAILED DESCRIPTION OF EMBODIMENTS OF THE INVENTION

Figure 1:
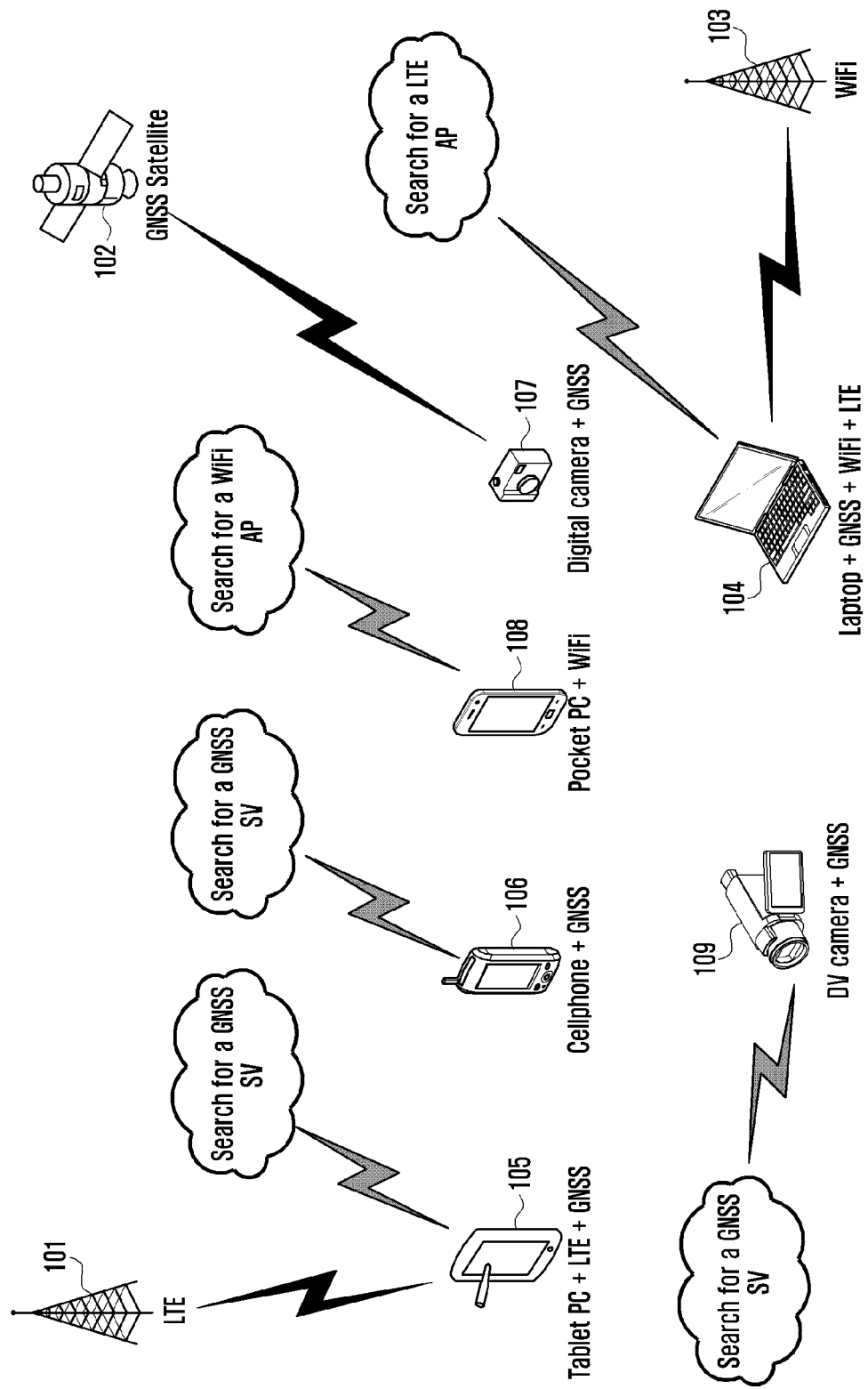
FIG. 1 illustrates a current state in which each device tries to acquire a wireless signal after a cold start.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in this description are not to be interpreted by their common or dictionary meaning but based on the principle that an inventor can adequately define the meanings of terms to best describe the present invention, to be interpreted by the meaning and concept conforming to the technical concept of the present invention.

In the drawings, certain elements may be exaggerated, omitted, or schematically depicted for clarity of the disclosure. The actual sizes of the elements are not reflected. Thus, embodiments of the present disclosure are not limited in the relative sizes of the elements and distances therebetween.

The claimed invention is applicable to any wireless signal source, not only the GPS, because modern mobile devices comprise, as a rule, several transceivers for establishing wireless connection in, for example, Wi-Fi, GSM, LTE, etc.

In accordance with the claimed invention, the said LPWN may be based on various technologies, such as Bluetooth, IrDA, UWB, Z-Wave, WLAN, ZigBee or other technologies used in LPWN at a short distance.

In accordance with the claimed invention, the said auxiliary information may contain a list of accessible sources of wireless communication, such as GNSS, Wi-Fi, CDMA, GPS, GSM, etc, and/or the operational frequency of a certain source of wireless communication and/or other configurations of the sources of wireless communication.

This process is an equivalent of a so-called hot start. A mobile device starts searching among several devices in close vicinity and, if it detects such devices, it uses a-priori information received from these devices for further searching.

For example, one may consider the case of using cell phones in a subway (underground) system. At present, the cell phones search for a base station even within tunnels, but it's not necessary because there are no base stations in tunnels, and such searching results in a waste of the UE's resources. It would be very useful to obtain information indicating that there is no base station and to readjust a signal searching procedure. But when the mobile device arrives at a subway station, it must request for a GSM signal because a base station signal can usually be detected within an underground hall. This a-priori information can greatly save computational resources of mobile devices. A mobile device detects another mobile device located nearby, for example, located in the same subway hall, and thus it can establish connection with the base station using the a-priori auxiliary information.

The present invention acquires wireless signals from wireless sources with less effort, as well as reducing system resource consumption when the wireless signal is not present. In other words, the present invention enables a mobile device to take information for signal acquisition from another device in the vicinity via low power and a low distance wireless network and to use this information for reducing system resources consumption.

The present invention also offers capability of working with any number of UEs. In the described architecture the UE doesn't use pairing, but rather it uses LPWN.

Also, the present invention is based on transmission of broadcast messages, in contrast with single-address messages. In the present invention, a request is transmitted as broadcast messages. One device doesn't know of the presence of another device in close vicinity, and tries to get information by using broadcast requests.

Also, the present invention includes a variant, where a UE without a special transceiver is capable of caching the assistance information about wireless sources and then offering this information to other UEs by means of broadcast replays to the requests from other UEs.

In contrast with the prior art, the present invention is capable of operating without any server. It works without a center element, the devices interchange auxiliary information with other devices and there is no need for a remote server. It eliminates the problem where the device fails to be connected to server, because in most cases the devices are located nearby even in an underground hall, streets and other public places. It also capable of working with any wireless source, for example LTE, Wi-Fi, GNSS, etc.

To receive a signal, it is necessary to analyze an entire range of possible values, for example, Doppler frequency shift and a code delay for CDMA signal. This results in a two dimensional search.

According to the present invention, each device can receive and transmit auxiliary information via a low power wireless network. When a user, for example, turns on a cell phone and activates a GPS module (GPS system based on CDMA signal), instead of searching for a GPS signal in the entire range of indeterminacy (at any possible Doppler frequency and C/A code phase) the device can receive auxiliary information via LPWN, thus searching for a signal with less effort in a limited range of indeterminacy (for example, less Doppler frequencies need to be analyzed).

Nowadays, as seen in FIG. 1, each device works individually, and tries to acquire a desired signal without any auxiliary information (without any a-priori information). This sometimes results in wasting mobile device resources. As shown in FIG. 1, only one mobile device (Digital camera 107) has already acquired the desired signal while others try to find it.

Figure 2:
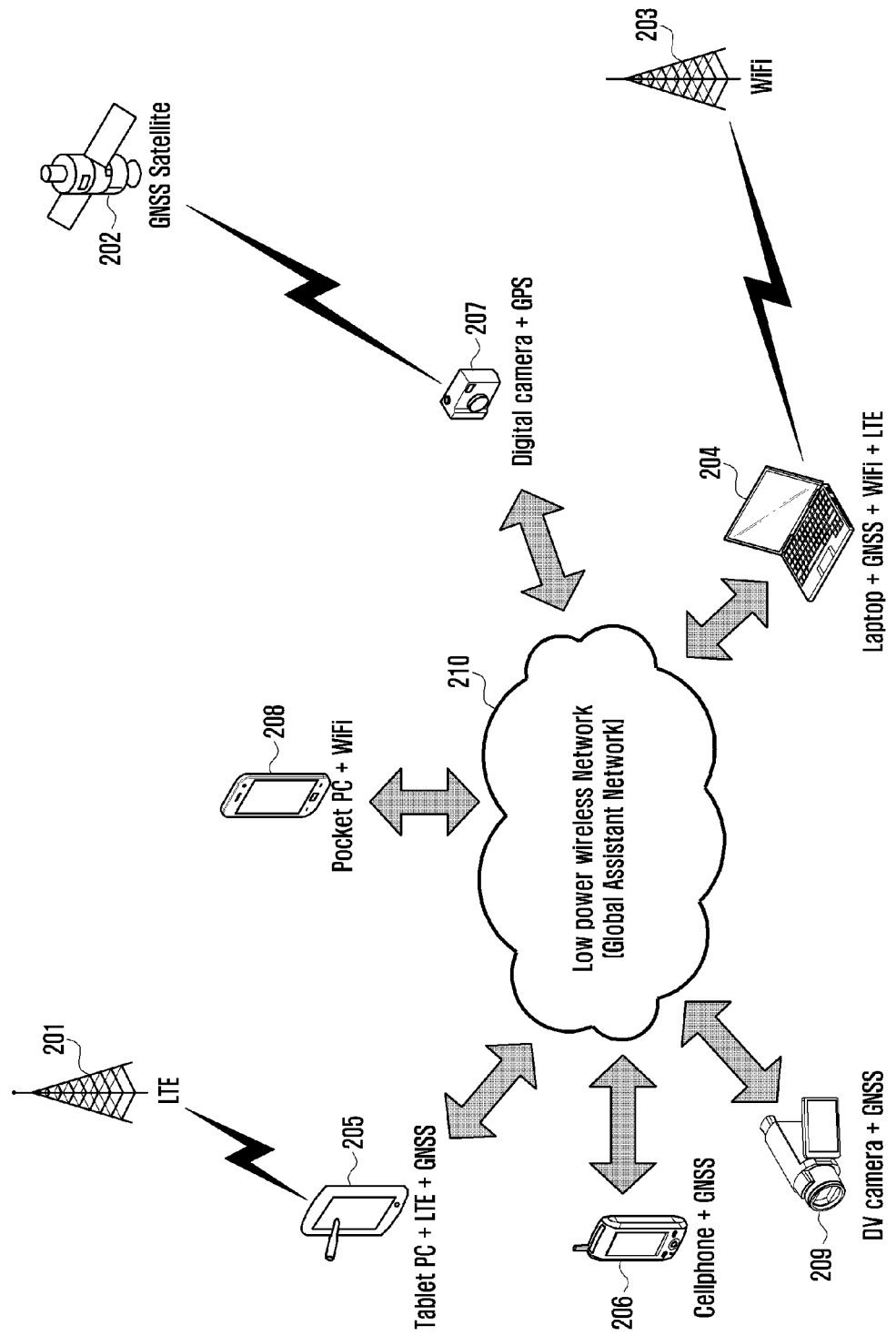
FIG. 2 illustrates a network according to the present invention when each device is trying to connect with a low power wireless network.

Referring to FIG. 2, each UE 204-209 connects to Low Power low distance Wireless Network 210. Every UE 204-209 can share information about available wireless sources. As shown in FIG. 2, for example, Laptop 204 shares information about an available Wi-Fi AP, digital camera 209 shares information about an available GNSS satellite, tablet PC 205 shares information about an LTE base station.

As shown in FIG. 2, UEs 206, 208, 209 try to get auxiliary information from low power wireless network (LPWN) 210. Auxiliary information contains the type of the available wireless source (GNSS, Wi-Fi, GSM, CDMA, etc.) and general parameters for acquiring the signal on another device.

Auxiliary information may contain any information about the wireless source such as list of available sources, frequency of particular wireless sources and any other additional information which can help in searching for a desired wireless source with less effort. This information reduces the region of the uncertainties parameters. In other words, the information can refine indeterminacy range of wireless source. For example, indeterminacy range of the wireless source parameters may be reduced in accordance with becoming more certain of the uncertainties parameters by acquiring the signal.

Figure 3:
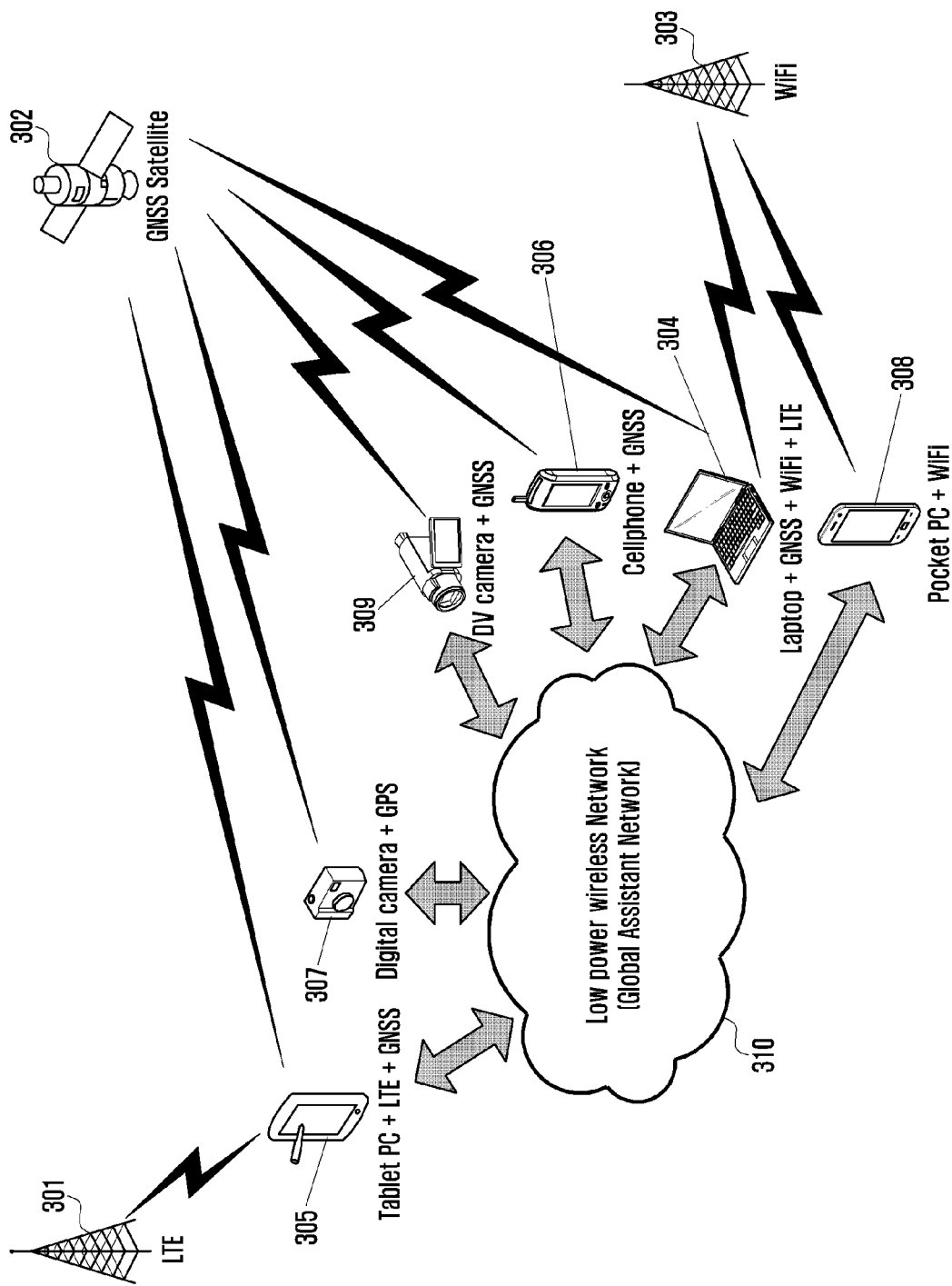
FIG. 3 illustrates a network according to the present invention when every device makes a warm start with an auxiliary information.

If auxiliary information is available, UEs 206, 208, 209 use a-priori information during an acquisition procedure. When a device gets auxiliary information from an LPWN, it tries to acquire the signal, and if it is successful, it shares this information with other devices. As shown in FIG. 3, all UEs 304-309 in short range acquire the desired signal and can share assistance information about this wireless signal with the LPWN.

If the auxiliary information does not contain information about a desired signal, the UE can start the acquisition procedure without any a-priori information or it can switch off its transceiver. This depends on the UE's configuration providing the switch off function.

In a case when no one device knows about availability of a wireless source, UEs work according to their own configuration. Each UE can try to acquire a desired wireless signal or several UEs can decide which UE should try to acquire the signal. This process takes into consideration battery level, speed of the mobile device's CPU, sensitivity of a wireless transceiver and other important parameters to acquire the signal.

Figure 4:
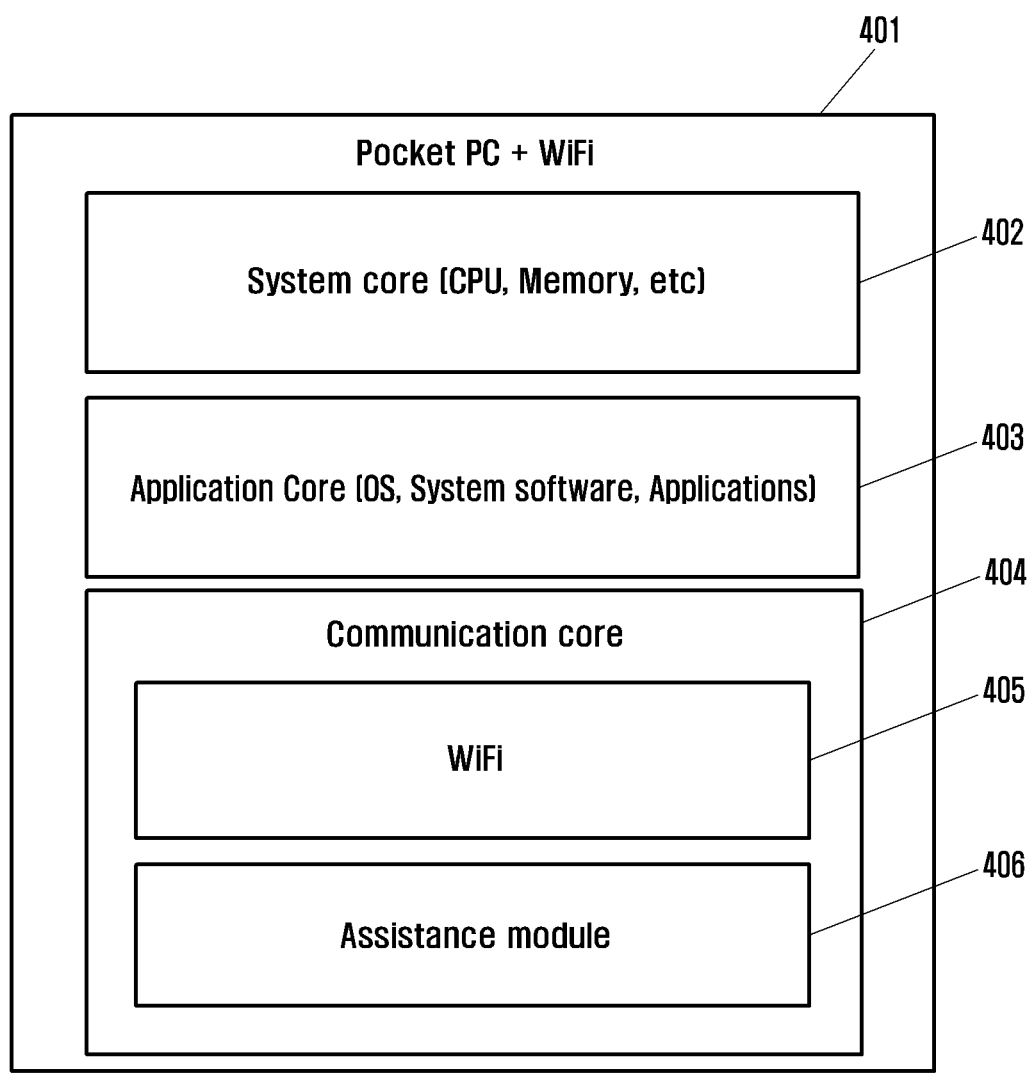
FIG. 4 is a block diagram illustrating a pocket PC device with Wi-Fi and an assistance module.
Figure 5:
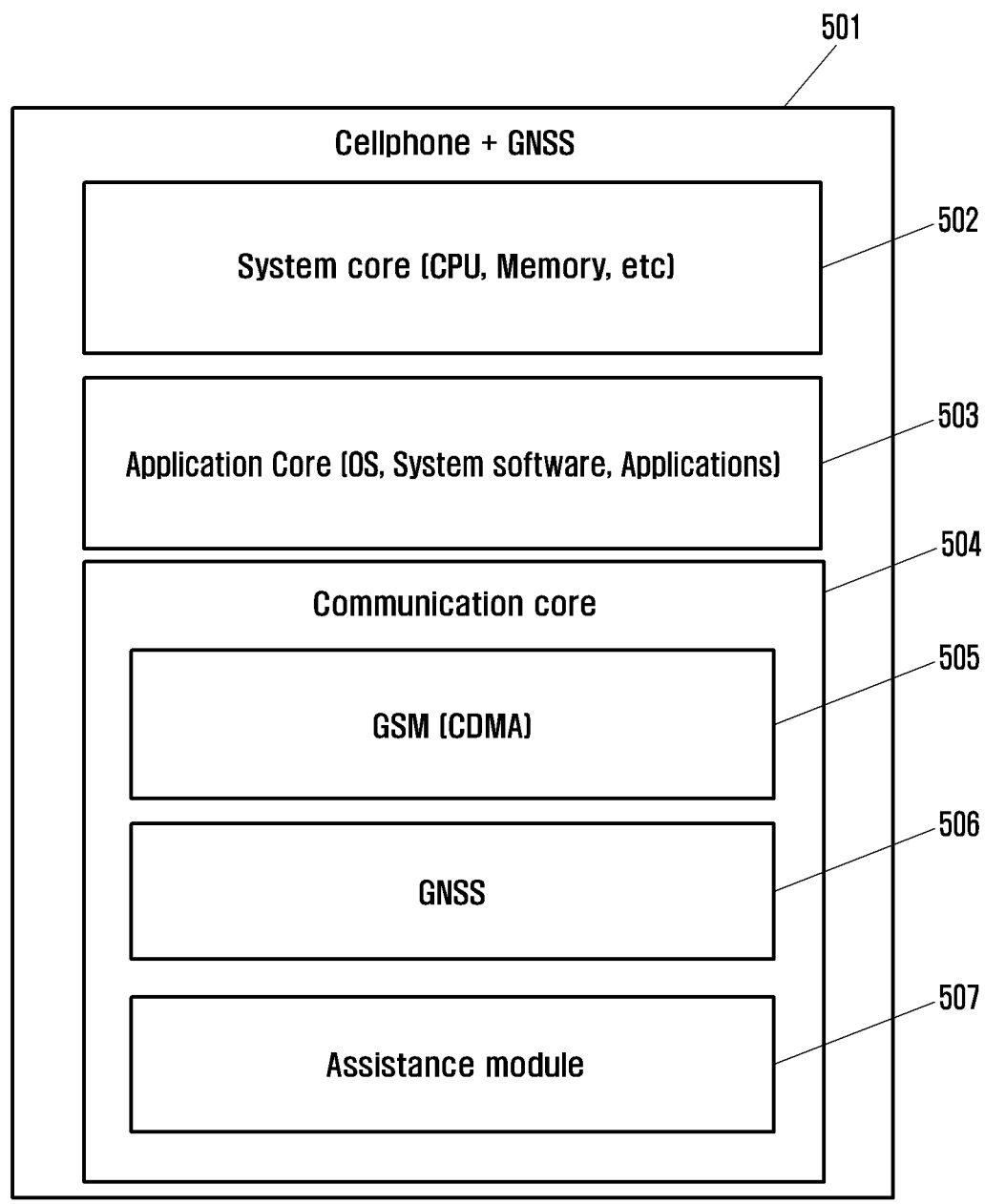
FIG. 5 is a block diagram illustrating a cell phone with GSM (or CDMA), GNSS and an assistance module.
Figure 6:
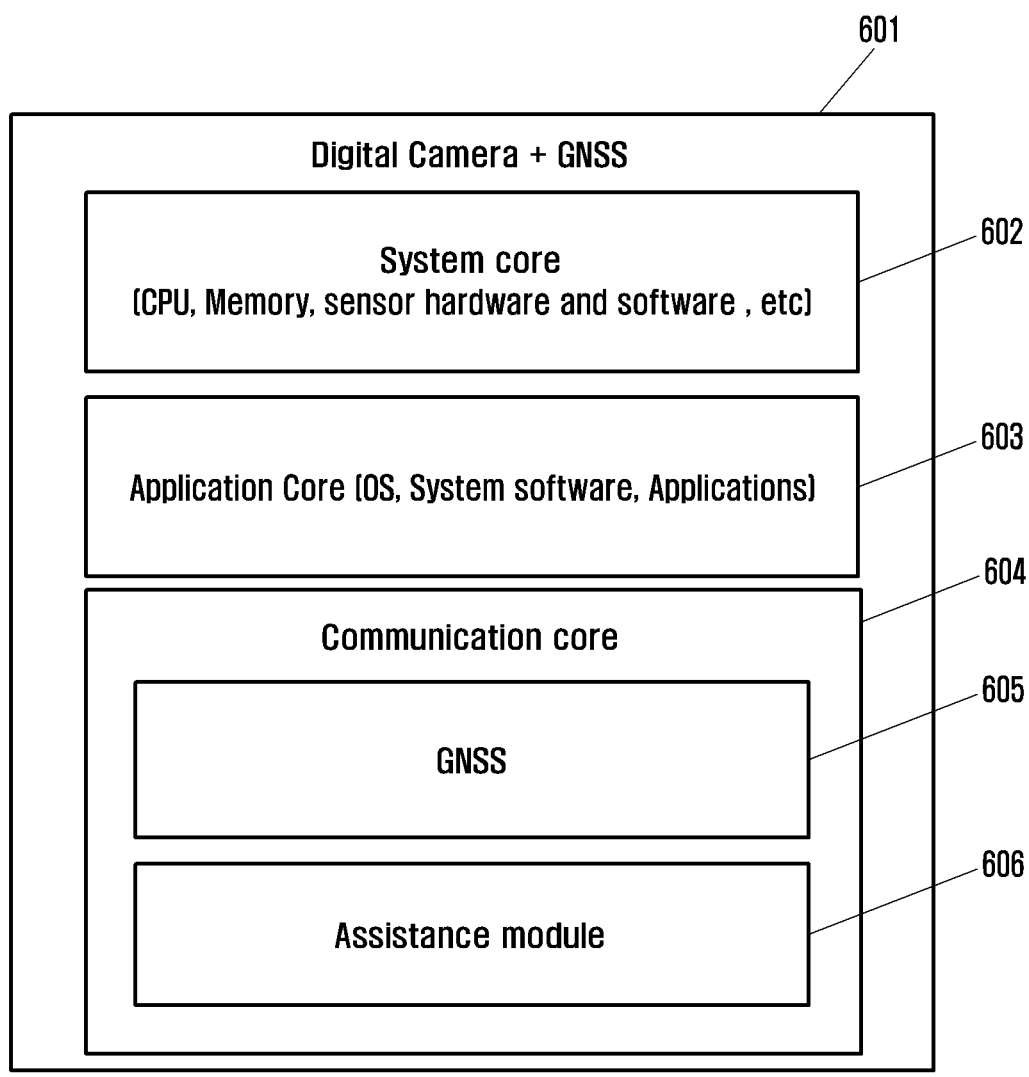
FIG. 6 is a block diagram illustrating a Digital Camera with GNSS and an assistance module.

Many UE's or mobile devices (for example 401, 501, 601 in FIGS. 4-6) have several internal cores. At the least, they have a system core (CPU, memory, etc. 402, 502, 602 in FIGS. 4-6) and an application core (software on UE 403, 503, and 603 in FIGS. 4-6). Also many UEs have a communication core (404, 504, and 604 in FIGS. 4-6). For example, many digital cameras have a GPS transceiver for tagging pictures with coordinates (605 in FIG. 6), many devices like a Pocket PC have a wireless core (404 in FIG. 4) with a wireless transceiver like Wi-Fi (405 in FIG. 4). Also many UEs have a communication core (504 in FIG. 5) as a standard part of, for example, cellular phones (505 in FIG. 5). All of these devices can be equipped with an assistant module (407, 507, and 607 in FIGS. 4-6) as part of the communication core. The assistance module connects with an Application core and every wireless transceiver. From the Application core, it takes current configuration and manages every wireless transceiver. The assistance module can switch on or switch off any wireless transceiver depending on its configuration file and assistance information. It can greatly reduce waste of system resources because the wireless transceiver won't work when a desired wireless signal is not available. It can also reduce waste of system resources because the UE can get assistance information from other UEs in its vicinity.

Figure 7:
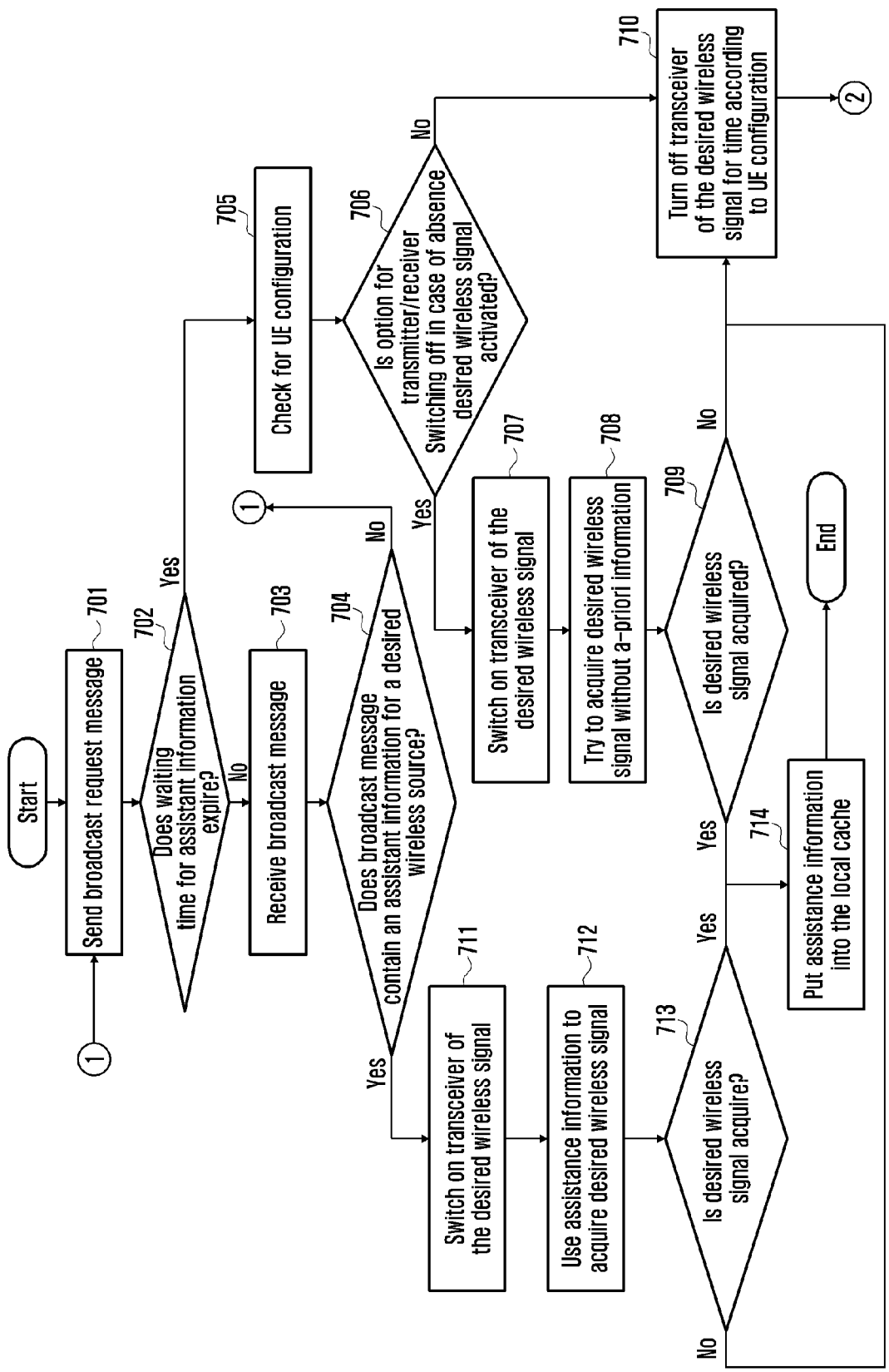
FIG. 7 is a flowchart illustrating an algorithm for finding a desired signal.

The algorithm of the method of the present invention is shown in FIG. 7, when an UE needs to acquire a signal (for example, the UE is recently switched on and it tries to connect with a wireless source). First, the UE sends a broadcast request message in step 701. The UE then tries to get the assistance information for some time according to the UE configuration while a waiting time counts down, and decides whether waiting time for assistance information expires or not in step 702. And the UE receive the broadcast message in step 703. The UE then decides whether the broadcast message contains assistance information about a desired wireless source or not in step 704. If the message contains the assistance information in step 704, the UE switches on the wireless transceiver in step 711, and uses this information as a-priori knowledge about a desired wireless source in step 712. Then, if the UE acquires desired wireless signal in step 713, the assistance information is put into the local cache in step 714.

In the case when the UE doesn't receive assistance information in step 702, it checks the UE configuration in step 705. If the configuration considers acquiring a desired wireless source without any a-priori knowledge in step 706, the UE switches on its wireless transceiver for the desired wireless source in step 707 and tries to acquire this signal in step 708. If this acquiring process fails in step 709, the assistant module of the UE switches off the wireless transceiver of the desired wireless source in step 710 for some time according to the UE configuration for reducing consumption of the system resources. The assistant module can also switch off the transceiver without trying to search for the desired wireless signal in step 706 and this can greatly reduce system resource consumption.

Figure 8:
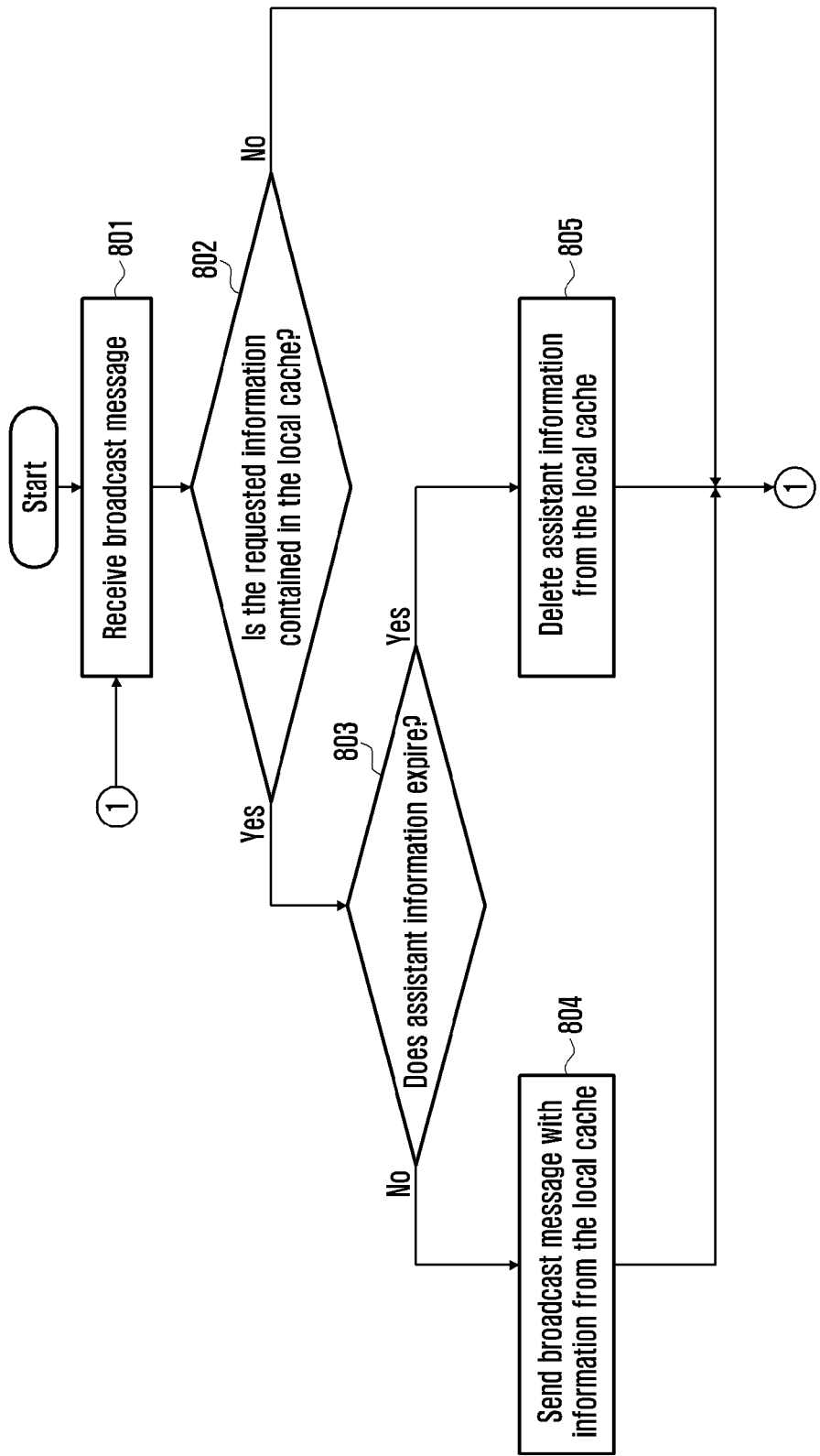
FIG. 8 is a flowchart illustrating an algorithm for sharing auxiliary information.

The assistance module of the UE (406, 507, and 606) also can share assistance information according to the algorithm of FIG. 8. After receiving the broadcast message in step 801, it is determined if the assistance module has stored assistance information in the local cache in step 802. The UE can put in the local cache assistance information about connected wireless sources as well as information from the LPWN. Information about the connected wireless source has a higher priority than information from the LPWN. For example, if the UE has a GNSS transceiver and has already connected to the GNSS satellites, this information is put in the local cache and stored, but information from the LPWN about GNSS satellites is not put into the cache. If the UE doesn't have a particular transceiver, it puts the auxiliary information obtained from the LPWN into the local cache if this information is newer than information which is already cached. The UE permanently listens for a request to broadcast messages in step 801. When this kind of message is received, UE checks for available information in the local cache in step 802. If required information is contained in the local cache and the information hasn't expired in step 803, the UE sends a broadcast replay with this auxiliary information in the LPWN in step 804. If the information expires in step 805, it is deleted from the cache.

The assistant module has software and hardware parts, and can receive/transmit messages from/to the LPWN and manage the wireless transceiver. According to assistance information from the LPWN it can switch on or switch off a particular wireless transceiver from the wireless core. Moreover, if the UE doesn't have a particular wireless transceiver it can still share auxiliary information about the wireless source. For example, in FIG. 5, this UE communication core doesn't have a Wi-Fi core, but this UE can share information about Wi-Fi from the local cache store according to the algorithm of FIG. 8.

The present invention may be implemented with existing wireless technology like ZigBee, Bluetooth, IrDA, UWB, Z-Wave, WLAN or any other technology compatible with LPWN. The software part works with the wireless core of the mobile device and with low power wireless protocol. The mobile device receives and transmits messages with available sources and auxiliary information related to them. The software part switches off a particular wireless transceiver core if the auxiliary information indicates that a signal isn't present in this place or tries to acquire a wireless signal without any a priori information. The behavior depends on a wireless source and situation. To reduce the battery consumption the software core may turn off a wireless transceiver but it can reduce security level. One device can provide another device with assistance information with fake data. At the same time a mobile device can coordinate with another UE the attempt of acquiring signal again and can wait for the results of the search from that other UE. Also UE can acquire desired wireless source by itself.

The auxiliary module receives the configuration from the application core and controls transceivers on the basis of such information. It can greatly reduce waste of the system resources because a wireless transceiver doesn't work when desired wireless signal is not available, also it can reduce waste of system resources because UE can get assistance information from other UE's with the LPWN range.

The present invention may be executed using hardware, or a combination of hardware and software and may be realized as an individual chip or a part of a system on a chip (SoC).

While the present invention has been shown and described with reference to certain embodiments thereof, it will be understood by those skilled in the art that various changes in form and detail may be made therein without departing from the spirit and scope of the invention as defined by the appended claims.

What is claimed is:

1. A method for obtaining auxiliary information about various wireless signal sources by a User Equipment (UE) and for sharing received information with other UE devices located nearby, the method comprising:
   broadcasting, by a UE Assistance Module, a request for obtaining auxiliary information from a public Low Power Wireless Network (LPWN) and receiving broadcast messages containing auxiliary information from the public LPWN;
   checking the received broadcast messages for presence of auxiliary information regarding desired sources of wireless communication;
   refining, on the basis of the received auxiliary information, the indeterminacy range of wireless signal parameters by the UE Assistance Module and by switching a transceiver of the UE on and off;
   storing the auxiliary information in a UE local cache and updating the auxiliary information; and
   adding the auxiliary information from the UE local cache to a broadcast message via the LPWN.

2. The method of claim 1, wherein the public LPWN is implemented on the basis of a communication technology, including Bluetooth, InfraRed Data Association (IrDA), Ultra-WideBand (UWB), Z-Wave, Wireless Local Area Network (WLAN), ZigBee, or other low power and short range networks.

3. The method of claim 1, wherein the auxiliary information contains a list of accessible wireless signal sources, including Global Navigation Satellite System (GNSS), Wi-Fi, Code Division Multiple Access(CDMA), Global Positioning System (GPS), Global System for Mobile communications (GSM), the frequency of a particular wireless signal source, and/or other configurations of wireless signal sources.

4. A User Equipment (UE) device in a Low Power Wireless Network (LPWN), comprising:
   a system core, including at least a Central Processing Unit (CPU) and a memory unit;
   an application core functioning with Operating System (OS) configurations of the UE device and with applications; and
   a communication core comprising wireless transceivers, controlled by an Assistance Module capable of:
      broadcasting request messages and receiving broadcasted messages to obtain auxiliary information from the LPWN;
      switching on/off wireless transceivers according to the configuration of the UE device and on the basis of obtained auxiliary information;
      storing the auxiliary information in a UE local cache: and
      adding the auxiliary information from the UE local cache to a broadcast message via the LPWN.

5. The device of claim 4, wherein the Assistance Module comprises a software part capable of switching off a particular wireless transceiver where the auxiliary information indicates absence of a desired wireless signal, or continuing a wireless signal reception without any a priori information.

6. The device of claim 4, wherein the Assistance Module is capable of sharing the auxiliary information with other UE devices via broadcast messages in a public LPWN.

7. An Assistance System, comprising:
   at least two User Equipment (UE) devices located nearby each other and capable of receiving and transmitting auxiliary information regarding various wireless signal sources in a public Low Power Wireless Network (LPWN),
   wherein each UE device of the at least two UE devices comprises:
   a system core, including at least a Central Processing Unit (CPU) and a memory unit;
   an application core functioning with Operating System (OS) configurations of the UE device and with applications; and
   a communication core comprising wireless transceivers, controlled by an Assistance Module capable of:
      broadcasting request messages and receiving broadcasted messages to obtain the auxiliary information from the public LPWN;
      switching on/off the wireless transceivers according to a configuration of the UE device and on a basis of the obtained auxiliary information:
      storing the auxiliary information in a UE local cache; and
      adding the auxiliary information from the UE local cache to a broadcast message via the public LPWN.

8. A method, in a User Equipment (UE), for sharing auxiliary information about various wireless signal sources with other UE devices located nearby, the method comprising:
   checking whether requested auxiliary information is included in a UE local cache of the UE when a broadcasting request message is received from another UE; and
   adding the requested auxiliary information from the UE local cache to broadcasting messages and transmitting the broadcasting messages via a Low Power Wireless Network (LPWN) when the requested auxiliary information is included in the local cache and when the auxiliary information is not expired.

* * * * *